United States Patent
Kawano

(10) Patent No.: US 10,173,258 B2
(45) Date of Patent: Jan. 8, 2019

(54) STEEL FOR MOLD, AND MOLD

(71) Applicant: DAIDO STEEL CO., LTD., Aichi (JP)

(72) Inventor: Masamichi Kawano, Aichi (JP)

(73) Assignee: DAIDO STEEL CO., LTD., Aichi (JP)

( * ) Notice: Subject to any disclaimer, the term of this patent is extended or adjusted under 35 U.S.C. 154(b) by 317 days.

(21) Appl. No.: 14/689,583

(22) Filed: Apr. 17, 2015

(65) Prior Publication Data

US 2015/0314366 A1 Nov. 5, 2015

(30) Foreign Application Priority Data

Apr. 30, 2014 (JP) ................................. 2014-093742

(51) Int. Cl.
| | |
|---|---|
| *B22C 9/06* | (2006.01) |
| *C22C 38/44* | (2006.01) |
| *C22C 38/38* | (2006.01) |
| *C22C 38/32* | (2006.01) |
| *C22C 38/28* | (2006.01) |
| *C22C 38/26* | (2006.01) |
| *C22C 38/22* | (2006.01) |
| *C22C 38/20* | (2006.01) |
| *C22C 38/06* | (2006.01) |
| *C22C 38/04* | (2006.01) |
| *C22C 38/30* | (2006.01) |
| *B22D 17/22* | (2006.01) |

(Continued)

(52) U.S. Cl.
CPC .......... *B22C 9/061* (2013.01); *B22D 17/2209* (2013.01); *B22F 3/1055* (2013.01); *B22F 5/007* (2013.01); *B29C 45/26* (2013.01); *B30B 15/02* (2013.01); *C22C 33/0264* (2013.01); *C22C 38/02* (2013.01); *C22C 38/04* (2013.01); *C22C 38/06* (2013.01); *C22C 38/20* (2013.01); *C22C 38/22* (2013.01); *C22C 38/24* (2013.01); *C22C 38/26* (2013.01); *C22C 38/28* (2013.01); *C22C 38/30* (2013.01); *C22C 38/32* (2013.01); *C22C 38/38* (2013.01); *C22C 38/44* (2013.01); *B22F 2999/00* (2013.01); *B33Y 70/00* (2014.12); *B33Y 80/00* (2014.12); *C21D 1/673* (2013.01); *Y02P 10/292* (2015.11); *Y02P 10/295* (2015.11)

(58) Field of Classification Search
CPC .... B22C 9/061; B22D 17/2209; Y02P 10/292
See application file for complete search history.

(56) References Cited

U.S. PATENT DOCUMENTS

| | | | |
|---|---|---|---|
| 5,139,737 A | 8/1992 | Sudo et al. | |
| 2002/0110649 A1* | 8/2002 | Skszek .................... | B29C 33/38 427/596 |

(Continued)

FOREIGN PATENT DOCUMENTS

| | | |
|---|---|---|
| JP | H03-177536 A | 8/1991 |
| JP | 4-297550 | 10/1992 |

(Continued)

OTHER PUBLICATIONS

Search Report issued by European Patent Office (EPO) in EPO Patent Application No. 15164450.7, dated Dec. 4, 2015.

(Continued)

*Primary Examiner* — James Sanders
(74) *Attorney, Agent, or Firm* — Greenblum & Bernstein, P.L.C.

(57) ABSTRACT

The present invention relates to a steel for a mold, having a composition containing, on a % by mass basis, 0.25%<C<0.38%, 0.01%<Si<0.30%, 0.92%<Mn<1.80%, 0.8%<Cr<2.2%, 0.8%<Mo<1.4%, and 0.25%<V<0.58%, with the balance being Fe and inevitable impurities, and a mold manufactured by additive manufacturing by using the steel for a mold.

9 Claims, 2 Drawing Sheets

(51) Int. Cl.
    *B29C 45/26*     (2006.01)
    *B30B 15/02*     (2006.01)
    *B22F 5/00*     (2006.01)
    *C22C 33/02*     (2006.01)
    *C22C 38/02*     (2006.01)
    *C22C 38/24*     (2006.01)
    *B22F 3/105*     (2006.01)
    *B33Y 80/00*     (2015.01)
    *B33Y 70/00*     (2015.01)
    *C21D 1/673*     (2006.01)

(56) References Cited

U.S. PATENT DOCUMENTS

2005/0115644 A1   6/2005   Beguinot
2015/0246391 A1   9/2015   Andreussi et al.

FOREIGN PATENT DOCUMENTS

| | | |
|---|---|---|
| JP | 2005-527703 A | 9/2005 |
| JP | 4992344 A | 3/2008 |
| JP | 2008-121032 A | 5/2008 |
| JP | 2010-194720 A | 9/2010 |
| JP | 2011-094168 A | 5/2011 |
| JP | 2011-256434 A | 12/2011 |
| WO | 2011/149101 | 12/2011 |
| WO | 2014/041409 | 3/2014 |

OTHER PUBLICATIONS

Japanese Office Action issued with respect to Appl. No. 2014-093742, dated Dec. 25, 2017, along with an English translation thereof.

Chinese Office Action from Application No. 201510220065.1 dated Sep. 18, 2017.

* cited by examiner

STEEL FOR MOLD, AND MOLD

FIELD OF THE INVENTION

The present invention relates to a die steel and a mold steel, and a mold, which are excellent in terms of both high-temperature strength and heat conduction performance.

BACKGROUND ART OF THE INVENTION

Molds such as molds for injection molding, molds for die casting, and molds for hot pressing (also called as hot stamping or die quenching), which are used for resins, rubbers, etc., have conventionally been produced generally by melting a steel to form an ingot thereof, thereafter subjecting the ingot to forging and rolling to form a block or a flat rectangular material, machining this material into a shape of a mold, and then giving thereto heat treatments such as quenching and tempering.

A generally employed technique concerning these molds is to form a cooling circuit (water cooling line) within the wall of the mold and pass cooling water therethrough to thereby cool the mold.

In such molds, to heighten the efficiency of cooling with cooling water results in a reduction in cycle time, i.e., fast-cycle production (molding) of products, and this leads to an improvement in production efficiency.

A direct method for heightening the efficiency of cooling is to dispose the cooling circuit nearer to the molding surface (design surface) of the mold.

However, this method has the following drawback. Due to the reduced distance between the cooling circuit and the molding surface and due to the generation of stronger thermal stress, the mold is prone to develop a severe crack (through crack propagation from the water cooling circuit to the molding surface), which is causative of a decrease in mold life.

Consequently, in cases when the cooling circuit is disposed nearer to the molding surface, there are limitations as a matter of course.

Another possible method may be one in which a cooling circuit that runs complicatedly meanderingly in all directions is formed within the wall of the mold to heighten the cooling ability by regulating the overall shape of the cooling circuit, layout thereof, etc. However, with any method in which a mold is produced through machining, it is technically impossible to form a cooling circuit having such a complicated shape.

Under such circumstances, attention is recently being focused on a technique for manufacturing a mold by additive manufacturing (three-dimensional additive manufacturing).

Additive manufacturing is a technique of processing for converting a three-dimensional model data into an actual object by accumulation of a material. In additive manufacturing, a shape expressed by three-dimensional computer aided design (CAD) data is first sliced along a plurality of planes perpendicular to a predetermined axis, and the sectional shapes of the resultant slices are calculated. The shapes of these slices are actually formed, and the formed slices are stacked and bonded together, thereby converting the computer-expressed shape into an actual object.

In additive manufacturing, there are cases where a powder is used as the material and cases where plates are used as the material.

In the method in which a powder is used as a material, the powder is evenly spread into a layer (each layer has a thickness of, for example, several tens of micrometers), and certain regions of the powder layer are irradiated with thermal energy, for example, irradiated with a laser beam of an electron beam, to melt/solidify or to sinter the powder layer. Layers are thus superposed one by one to thereby fabricate a whole shape.

Meanwhile, in additive manufacturing in which plates are used as a material, individual parts (plates) resulting from the slicing of three-dimensional model data in a CAD are actually produced by machining, etc., and these parts are stacked and bonded together by, for example, diffusion bonding, thereby manufacturing a whole three-dimensional shape.

Examples of mold production by these additive manufacturing techniques are disclosed, for example, in Patent Documents 1 and 2.

Specifically, Patent Document 1 discloses an invention relating to "a metal powder for selective laser sintering, a method for manufacturing a three-dimensional shaped object by using the same, and the three-dimensional shaped object obtained therefrom." Disclosed therein is a feature of forming a solidified layer by irradiating a predetermined portion of a layer of a powdery material including a precipitation-hardening metal composition with a light beam, thereby allowing sintering of the powder of the predetermined portion or melting and subsequent solidification thereof, and forming another solidified layer by newly forming a powder layer on the resulting solidified layer, and then irradiating another predetermined portion of the new powder layer with the light beam, these steps being repeatedly performed, to thereby produce a three-dimensional shaped object.

Patent document 2 discloses an invention relating to "a cavity insert for mold, a method for manufacturing an insert for mold, and a resin molding mold." Disclosed therein is a feature that a cavity insert having a spiral cooling passage inside is produced based on slice data of the cooling passage by processing a groove which forms the cooling passage in each of a plurality of metal plates, laminating the groove-processed metal plates in a prescribed order, diffusion-bonding the laminated metal plates, and shape-processing a metal block obtained by the diffusion bonding.

The techniques of additive manufacturing described above are ones that fabricate a whole shape by stacking a material, and are capable of easily forming a complicated cooling circuit which runs meanderingly in all directions and which cannot be formed by machining at all. As a result, the efficiency of cooling can be effectively rendered higher than that of molds produced by conventional machining, without the need of disposing the cooling circuit unnecessarily close to the molding surface of the mold.

Hitherto, maraging steels and precipitation hardening-type stainless steels have been used as a material for molds required to have high-temperature strength.

In patent document 1 also, powders of a maraging steel or a precipitation hardening-type stainless steel are hence used as materials for molds.

Although such steels including maraging steels and precipitation hardening-type stainless steels have high-temperature strength sufficient for molds, there is a problem in that these steels have low heat conduction performance (low coefficient of thermal conductivity) since the matrix phase thereof contains elements which are prone to form a solid solution, such as Si, Cr, Ni, and Co, in a large amount.

Molds produced by additive manufacturing have advantages in that a cooling circuit having a freely designed complicated shape can be disposed therein and that consequently even a mold to be produced by using a maraging steel or precipitation hardening-type stainless steel as a material therefor can be made to have a heightened cooling efficiency due to the shape effect of the cooling circuit formed to have a complicated shape by additive manufacturing. However, since the material itself has a low coefficient of thermal conductivity, it is difficult to heighten the efficiency of cooling to a sufficient level.

It is a matter of course that in cases where a mold is produced therefrom not by additive manufacturing but by a conventional general production method, the efficiency of cooling (heat exchange) becomes more insufficient.

Meanwhile, there are carbon steels, steels for mechanical structural use, and the like as steels having high heat conduction performance (having a high coefficient of thermal conductivity). These steels show high heat conduction performance since the contents of elements which are prone to form a solid solution, such as Si, Cr, Ni, and Co, in the matrix phase are low and since these steels are low-alloy steels.

However, these steels have low high-temperature strength and have a problem in that the molds produced therefrom have a short life.

Namely, there has been no steel provided so far for molds which is capable of giving a mold having sufficient performance in terms of both high-temperature strength and heat conduction performance, regardless of whether or not the mold is manufactured by additive manufacturing.

As a prior-art technique relevant to the present invention, Patent Document 3 discloses an invention relating to "a die steel having excellent thermal fatigue properties". Disclosed therein is a feature that the addition amounts of Si and Cr, which are alloying elements, are reduced and other alloying components are balanced, thereby attaining an increase in the coefficient of thermal conductivity and an increase in softening resistance.

As another prior-art technique, Patent Document 4 discloses an invention concerning "a steel for die". Disclosed therein is a feature that the addition amounts of Si, Mn, and Cr are properly balanced to thereby effectively regulate the coefficient of thermal conductivity of the steel to a value not less than a desired value and to sufficiently ensure machinability and impact value.

As another further prior-art technique, Patent Document 5 discloses an invention relating to "a die steel superior in spheroidizing annealing property and hardenability." Disclosed therein is a feature that by regulating the elements to be added to a steel, both hardenability and spheroidizing annealing property, which are required for large molds of 500 kg or more, are imparted to the steel.

The components of each of the steels described in Patent Documents 3 to 5 may partially overlap the components of the steel for a mold of the present invention with respect to the range of chemical components specified in their claims. However, there is no Example disclosed therein, which satisfies any of the claims of the present invention, and the steels of Patent Documents 3 to 5 substantially differ from that of the present invention.

In addition, the steels described in Patent Documents 3 to 5 are not intended to be used in additive manufacturing, and this use is not mentioned therein at all.

Patent Document 1: WO 2011/149101
Patent Document 2: JP-A-2010-194720
Patent Document 3: Japanese Patent No. 4,992,344
Patent Document 4: JP-A-2011-94168
Patent Document 5: JP-A-2008-121032

SUMMARY OF THE INVENTION

An object of the present invention, under the circumstances described above, is to provide a steel for a mold, which is capable of attaining both high high-temperature strength and heat conduction performance when a mold is produced therefrom by additive manufacturing. Another object of the present invention is to provide a steel for a mold, which is capable of attaining high high-temperature strength and heat conduction performance even when a mold is produced therefrom not by additive manufacturing but by machining a material obtained by working an ingot. A further object of the present invention is to provide a mold.

The steel for a mold according to the present invention is a steel for a mold, having a composition containing, on a % by mass basis:
   $0.25\% < C < 0.38\%$,
   $0.01\% < Si < 0.30\%$,
   $0.92\% < Mn < 1.80\%$,
   $0.8\% < Cr < 2.2\%$,
   $0.8\% < Mo < 1.4\%$, and
   $0.25\% < V < 0.58\%$,
with the balance being Fe and inevitable impurities.

The steel for a mold according to the present invention may further contain, on a % by mass basis:
   $0.1\% < Al < 1.2\%$.

The steel for a mold according to the present invention may further contain, on a % by mass basis, at least either of the following:
   $0.30\% < Ni \leq 3.5\%$,
   $0.30\% < Cu \leq 1.5\%$.

The steel for a mold according to the present invention may further contain, on a % by mass basis:
   $0.0001\% < B \leq 0.0050\%$.

The steel for a mold according to the present invention may further contain, on a by mass basis, at least one of the following:
   $0.003\% < S \leq 0.250\%$,
   $0.0005\% < Ca \leq 0.2000\%$,
   $0.03\% < Se \leq 0.50\%$,
   $0.005\% < Te \leq 0.100\%$,
   $0.01\% < Bi \leq 0.50\%$, and
   $0.03\% < Pb \leq 0.50\%$.

The steel for a mold according to the present invention may further contain, on a by mass basis, at least one of the following:
   $0.004\% < Nb \leq 0.100\%$,
   $0.004\% < Ta \leq 0.100\%$,
   $0.004\% < Ti \leq 0.100\%$, and
   $0.004\% < Zr \leq 0.100\%$.

The steel for a mold according to the present invention may further contain, on a by mass basis, at least either of the following:
   $0.10\% < W \leq 4.00\%$, and
   $0.10\% < Co \leq 3.00\%$.

The steel for a mold according to the present invention may have a coefficient of thermal conductivity at 25° C., evaluated by a laser flash method, of 28 W/m/K or higher.

The steel for a mold according to the present invention may be used as a material for manufacturing a mold by additive manufacturing.

In the present invention, the material may be a powder or plates.

The mold according to the present invention is a mold manufactured by additive manufacturing by using the steel for a mold according to the present invention.

The steel for a mold of the present invention is a low-alloy steel in which none of such elements as Si, Cr, Ni, and Co are added or such elements are added in smaller amounts as compared with conventional high-alloy steels such as maraging steels and precipitation hardening-type stainless steels, to thereby achieve a heightened coefficient of thermal conductivity. Meanwhile, the steel for a mold of the present invention has higher contents of such elements as Mn, Mo, and V as compared with steels for mechanical structural use, to thereby achieve enhanced high-temperature strength. The steel for a mold of the present invention combines high high-temperature strength and a high coefficient of thermal conductivity.

In addition, the steel for a mold of the present invention remains as a low-alloy steel which as a whole has reduced addition amounts of alloying-elements.

On the supposition of use in mold production by additive manufacturing, the contents of Cr and Mo, which are elements for improving hardenability, in the steel for a mold of the present invention have been reduced as compared with the contents thereof that are proper for the case of mold production by scraping. The steel for a mold of the present invention hence is in a lowly alloyed state accordingly.

For example, JIS SKD61 contains 5Cr and 1.5Mo, and JIS SKD7 contains 3Cr and 3Mo. In contrast, the steel for a mold of the present invention contains, on a % by mass basis, Cr<2.2% and Mo<1.4%.

Furthermore, the total content of Si+Mn+Cr+Mo+V in the invention is less than 6.2% by mass, which is lower by about 3 to 4% than the contents of Si+Mn+Cr+Mo+V in JIS SKD61 and JIS SKD7.

In additive manufacturing, in particular, in additive manufacturing in which a powder is used, thermal energy is applied to a layer of an evenly spread powder to harden the powder through melting/solidification or through sintering.

In this operation, the powder in a high-temperature state, e.g., a molten state, is rapidly cooled and automatically undergoes quenching. This quenching rapidly proceeds with a high cooling rate. Namely, quenching proceeds sequentially and simultaneously with each step of powder additive manufacturing.

Since the quenching proceeds with a high cooling rate as described above, the steel is satisfactorily quenched during the fabrication by additive manufacturing even if the steel has been compounded to have a reduced content of the hardenability-improving components as components of the steel beforehand.

Moreover, the steel for a mold of the present invention has a high coefficient of thermal conductivity since this steel is a low-alloy steel.

Although suitable for use as a material for additive manufacturing, the steel for a mold of the present invention can be used also in the case where a mold is produced from a steel ingot by forming the shape of a mold therefrom by machining. In this case, heat treatment conditions for quenching, etc. may be set in accordance with the elements contained.

The mold thus obtained has both high-temperature strength and high heat conduction performance because of the feature of the composition of the steel.

According to the present invention, it is possible to provide a steel for a mold and a mold, which are capable of attaining both high high-temperature strength and a high coefficient of thermal conductivity.

DETAILED DESCRIPTION OF THE INVENTION

Figure 1:
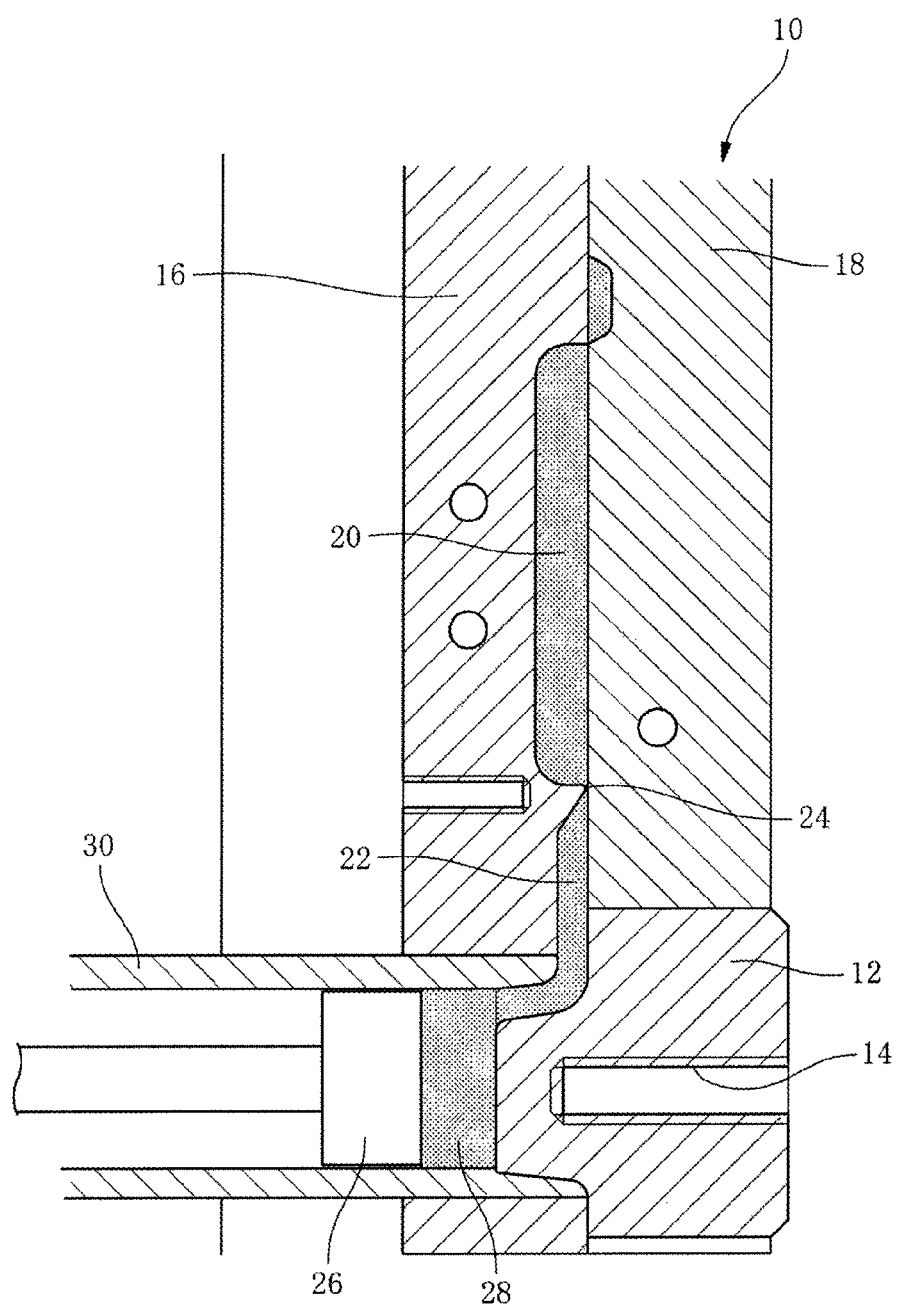
FIG. 1 is a cross-sectional view of a die casting mold as one embodiment of the present invention, the mold having a spool core.

Hereinafter, a steel for a mold according to the present invention will be described in detail. The steel for a mold according to the embodiment of the present invention contains elements described below as essential elements and the balance is formed of Fe and inevitable impurities. Reasons for limiting the content of each chemical component in the present invention are explained below. The values of the content of each chemical component are given on a % by mass basis.

0.25%<C<0.38%

In the case where 0.25%<C is satisfied, a mold produced by machining a material obtained by working an ingot can achieve, through a heat treatment, a hardness of 30-57 HRC, which is required of molds. A mold in the state of being as-produced by additive manufacturing also has a hardness of 30-57 HRC. Furthermore, also in the case where the mold obtained by additive manufacturing is heat-treated, a hardness of 30-57 HRC is achieved. In the case of C≤0.25%, in the mold produced by any production processes, hardness is insufficient. On the other hand, in the case of 0.38%≤C, the coefficient of thermal conductivity decreases.

0.01%<Si<0.30%

In the case of Si≤0.01%, machinability is deteriorated considerably. On the other hand, in case of 0.30%≤Si, the coefficient of thermal conductivity decreases considerably.

0.92%<Mn<1.80%

In the case of Mn≤0.92%, hardenability is insufficient when a mold produced by machining a material obtained by working an ingot is quenched or when a mold produced by additive manufacturing is quenched. On the other hand, the coefficient of thermal conductivity decreases in the case of 1.80%≤Mn. In addition, in the case of 1.80%≤Mn, temper embrittlement occurs when the content of P is high. A more preferred range is 0.92%<Mn<1.50%.

0.8%<Cr<2.2%

In the case of Cr≤0.8%, weatherability is insufficient. Furthermore, in the case of Cr≤0.8%, the steel has a blue shortness characteristic and ductility at 200° C. to 350° C. decreases. In addition, in the case of Cr≤0.8%, hardenability is insufficient when a mold produced by machining a material obtained by working an ingot is quenched or when a mold produced by additive manufacturing is quenched. On the other hand, the coefficient of thermal conductivity decreases in the case of 2.2%≤Cr.

0.8%<Mo<1.4%

In the case of Mo≤0.8%, it is difficult to ensure hardness by secondary hardening when a mold produced by machining a material obtained by working an ingot is quenched and tempered or when a mold produced by additive manufacturing is tempered (either after or without quenching), and high-temperature strength is also insufficient. On the other hand, in the case of 1.4%≤Mo, fracture toughness value decrease considerably.

0.25%<V<0.58%

In the case of V≤0.25%, coarsening of austenite crystal grains is problematic when a mold produced by machining a material obtained by working an ingot is quenched or when a mold produced by additive manufacturing is quenched. In addition, in the case of V≤0.25%, it is difficult to ensure hardness by secondary hardening when a mold produced by machining a material obtained by working an ingot is quenched and tempered or when a mold produced by additive manufacturing is tempered (either after or without quenching), and high-temperature strength is also insufficient. On the other hand, in the case of 0.58%≤V, those effects tend not to be enhanced anymore and the cost increases.

In addition, in the case of 0.58%≤V, there is a heightened possibility that in the case where a material for a mold is produced by an ordinary process (including melting, refining, casting, and hot working), coarse VC grains might crystallize out in a larger amount in the ingot during solidification in the casting and serve as starting points for mold fracture.

In the steel of the present invention, the following components are usually contained as unavoidable impurities in the following amounts.

0≤N≤0.05%
0≤P≤0.05%
0≤S≤0.003%
0≤Cu≤0.30%
0≤Ni≤0.30%
0≤Al≤0.10%
0≤W≤0.10%
0≤O≤0.01%
0≤Co≤0.10%
0≤Nb≤0.004%
0≤Ta≤0.004%
0≤Ti≤0.004%
0≤Zr≤0.004%
0≤B≤0.0001%
0≤Ca≤0.0005%
0≤Se≤0.03%
0≤Te≤0.005%
0≤Bi≤0.01%
0≤Pb≤0.03%
0≤Mg≤0.02%

The steel for a mold according to the present invention may optionally contain one or more kinds of elements selected from the elements described below in addition to the above-described essential elements. That is, the steel for a mold according to the present invention may consist only of, on a % by mass basis: 0.25<C<0.38, 0.01<Si<0.30, 0.92<Mn<1.80, 0.8<Cr<2.2, 0.8<Mo<1.4, and 0.25<V<0.58, with the balance being Fe and inevitable impurities, but it may optionally contain one or more kinds of elements selected from the elements with its contents as described below.

0.1<Al<1.2%

There are cases where the steel of the present invention is subjected to quenching after mold fabrication by additive manufacturing. It is possible to incorporate Al in an amount of 0.1<Al<1.2% by mass in order to inhibit the coarsening of austenite crystal grains during the quenching.

Al combines with N to form AlN and produces the effect of inhibiting the movement of austenite crystal grain boundaries (i.e., growth of the grains).

Since Al forms the nitride in the steel to contribute to precipitation strengthening, Al further has the function of enabling a nitrided steel material to have a heightened surface hardness. For a mold (including components that constitute some of the mold) to be nitrided in order to impart higher wear resistance thereto, use of the steel material containing Al is effective.

0.30<Ni≤3.5%, and 0.30<Cu≤1.5%

In recent years, the size of molds has tended to increase due to an increase in the size of mold components and integration thereof. Large molds are difficult to cool. Because of this, in the cases where a large mold made of a steel material having poor hardenability is quenched, precipitation of ferrite, pearlite or coarse bainite occurs during the quenching to deteriorate various properties. The possibility of this problem may be eliminated by selectively adding Cu and/or Ni to enhance hardenability. Specifically, the problem may be overcome by incorporating at least either of the following;

0.30<Ni≤3.5%, and
0.30<Cu≤1.5%.

Ni further has the effect of heightening the hardness by combining with Al to precipitate an intermetallic compound. Cu further has the effect of heightening the hardness through age precipitation. Preferred ranges are as follows:

0.50≤Ni≤3.0%, and
0.50≤Cu≤1.2%

Each element, when contained in an amount exceeding the given value, may segregate considerably, resulting in a decrease in suitability for mirror polishing.

0.0001<B≤0.0050% Addition of B is also effective as an expedient for improving hardenability.

Specifically, B may be incorporated according to need in the following amount:

0.0001<B≤0.0050%

Upon formation of BN, the B comes not to show the effect of improving hardenability. It is therefore necessary to cause the B in the steel to be present alone. Specifically, use may be made of a method in which an element having a higher affinity for N than B is used to form a nitride and thereby preventing the B from combining with the N. Examples of such an element include Nb, Ta, Ti, and Zr. Although these elements have the effect of fixing N even when present in impurity-level amounts, there are cases where addition of these elements in amounts within the ranges which will be described later is desirable depending on the content of N.

0.003<S≤0.250%, 0.0005<Ca≤0.2000%, 0.03<Se≤0.50%, 0.005<Te≤0.100%, 0.01<Bi≤0.50%, and 0.03<Pb≤0.50%

Since the steel of the present invention has a low Si content, this steel shows slightly poor machinability. An expedient usable for improving the machinability may be to selectively add S, Ca, Se, Te, Bi, and Pb. Specifically, at least one of the following elements may be added:

0.003<S≤0.250%,
0.0005<Ca≤0.2000%,
0.03<Se≤0.50%,
0.005<Te≤0.100%,
0.01<Bi≤0.50%, and
0.03<Pb≤0.50%.

Addition of each of these elements in an amount exceeding the given value results in no further improvement in machinability, a deterioration in hot workability, and decreases in impact value and suitability for mirror polishing.

0.004<Nb≤0.100%, 0.004<Ta≤0.100%, 0.004<Ti≤0.100%, and 0.004<Zr≤0.100%

In the case where an unexpected equipment trouble or the like occurs to result in an elevated heating temperature for quenching or in a prolonged heating period for quenching, there is a fear about deteriorations in various properties due to the coarsening of crystal grains. In preparation for such cases, use may be made of a method in which Nb, Ta, Ti, and Zr are selectively added and the coarsening of austenite crystal grains is inhibited by the action of fine precipitates formed by these elements. Specifically, at least one of the following elements may be incorporated:

0.004<Nb≤0.100%,
0.004<Ta≤0.100%,
0.004<Ti≤0.100%, and
0.004<Zr≤0.100%.

Each of these elements, when added in an amount exceeding the given value, yields carbides, nitrides, and oxides in an excess amount, resulting in decreases in impact value and suitability for mirror polishing.

0.10<W≤4.00%, and 0.10<Co≤3.00%

Although to increase the content of C is effective in enhancing strength, an excessive increase in C content results in deteriorations in property (impact value and mechanical fatigue property) due to an increase in carbide amount. For enhancing strength without arousing such a trouble, use may be made of a method in which W and Co are selectively added.

W heightens the strength by forming a fine precipitate of a carbide. Co heightens the strength by forming a solid solution in the base material and, simultaneously therewith, contributes to precipitation hardening through a change into the form of carbide. Specifically, at least either of the following may be incorporated:

0.10<W≤4.00% and
0.10<Co≤3.00%.

Addition of either element in an amount exceeding the given value results in no further property improvement and in a considerable increase in cost. Preferred ranges are as follows:

0.30≤W≤3.00% and
0.30≤Co≤2.00%.

EXAMPLES

Examples of the present invention are described below in detail.

A powder of each of seventeen types of steels respectively having the chemical compositions shown in Table 1 was produced by a gas atomization method. This powder was used to produce a spool core 12 as a part of the die casting mold 10 illustrated in FIG. 1, by three-dimensional additive manufacturing based on laser irradiation. This spool core 12 has a cooling circuit 14 formed thereinside. This cooling circuit 14 has a three-dimensional, spiral, complicated shape.

In Table 1, Comparative Example 1 is a die casting steel for hot working SKD61, Comparative Example 2 is an 18Ni maraging steel, Comparative Example 3 is a martensitic stainless steel SUS420J2, and Comparative Example 4 is a steel for mechanical structural use SCM435.

Although there are cases where each of the Examples according to the present invention contains impurity components in unavoidable amounts, the impurity components are not shown in the table.

TABLE 1

| | | \multicolumn{7}{c}{Chemical Composition (mass %) (remainder, Fe)} |
|---|---|---|---|---|---|---|---|---|
| | | C | Si | Mn | Cr | Mo | V | Others |
| Examples of the Present Invention | 1 | 0.37 | 0.07 | 1.49 | 1.91 | 1.11 | 0.57 | |
| | 2 | 0.27 | 0.09 | 1.41 | 1.98 | 1.14 | 0.26 | |
| | 3 | 0.29 | 0.22 | 1.33 | 1.07 | 1.05 | 0.38 | 0.6Al, 1.8Ni |
| | 4 | 0.35 | 0.14 | 1.79 | 1.46 | 1.35 | 0.5 | 0.75Cu, 0.012S |
| | 5 | 0.32 | 0.02 | 1.01 | 1.85 | 0.93 | 0.44 | 0.03Nb |
| | 6 | 0.33 | 0.29 | 1.17 | 0.94 | 1.23 | 0.32 | 1.2W, 0.9Co |
| | 7 | 0.31 | 0.19 | 1.73 | 1.33 | 0.87 | 0.51 | 0.001B |
| | 8 | 0.36 | 0.12 | 0.93 | 1.72 | 0.81 | 0.41 | 0.03Ti |
| | 9 | 0.26 | 0.04 | 1.09 | 2.12 | 1.39 | 0.29 | 0.75Al |
| | 10 | 0.28 | 0.17 | 1.25 | 1.2 | 0.99 | 0.35 | |
| | 11 | 0.3 | 0.24 | 1.57 | 0.81 | 1.17 | 0.47 | |
| | 12 | 0.34 | 0.27 | 1.65 | 1.59 | 1.29 | 0.53 | |
| | 13 | 0.37 | 0.29 | 1.79 | 2.19 | 0.84 | 0.31 | |
| Comparative Examples | 1 | 0.39 | 1.02 | 0.46 | 5.12 | 1.19 | 0.97 | |
| | 2 | 0.02 | 0.22 | 0.31 | <0.1 | 4.8 | <0.01 | 18.5Ni, 9Co, 0.1Al, 0.45Ti |
| | 3 | 0.38 | 0.99 | 0.43 | 13.4 | 0.11 | 0.23 | |
| | 4 | 0.36 | 0.28 | 0.71 | 1.03 | 0.19 | <0.01 | |

In FIG. 1, the die casting mold 10 includes a fixed half 16 and a movable half 18. A cavity 20 as a space for product-molding and a runner 22 have been disposed between the halves 16 and 18, and the cavity 20 and the runner 22 are connected to each other at a narrow gate 24.

The spool core 12 and a plunger 26 have been disposed at such a position that a cylindrical biscuit part 28, which lies at the position where the casting solidifies last, is sandwiched therebetween. The runner 22 extends from this biscuit part 28.

The spool core 12 has a groove formed therein, and this groove constitutes some of the runner 22.

The spool core 12 obtained by the procedure described above was heated at a temperature in the range of from 350° C. to 650° C. (tempering or aging) and thereby tempered to 43 HRC. Thereafter, the work was finished by machining into a final spool core shape. This spool core 12 is a spool core for a 135-ton die casting machine. The position of the spool core 12 in the mold structure is illustrated in FIG. 1. FIG. 1 is a cross-sectional view of the structure of the die casting mold viewed from a lateral side.

Cycles of die casting are repetitions of mold closing, injection, die timer, mold opening, product takeout, air blowing, release agent spraying, and air blowing in this order (FIG. 1 illustrates the stage of die timer).

First, the movable half 18 comes into contact with the fixed half 16, thereby bringing the mold into the closed state. As a result, the cavity 20 as a space for product-molding is formed. While keeping the mold in that state, a melt of an aluminum alloy is poured into a sleeve 30 with a ladle and injected with the plunger 26 moving at a high speed.

The melt injected moves through the runner 22 and flows, through the gate 24, into the cavity 20 in the forms of liquid, droplets, and/or mist. This may be easily understood when a water pistol or a sprayer is imagined. The cavity 20 is soon filled with the melt. A pressure is kept being applied to the melt with which the cavity 20 is filled, until the melt solidifies.

This is the stage called die timer, and FIG. 1 illustrates this stage. After the melt has solidified into a product, the movable half 18 is moved to open the mold. The product is taken out by using a push-out pin or a manipulator. Since the mold, which has been in contact with the high-temperature aluminum alloy, has a high temperature, this mold is cooled by air blowing and release agent spraying. The procedure described above is one cycle of die casting.

An investigation was made on the shortening of the die timer (the stage where the melt is being solidified within the mold) among those stages. In the case where the spool core 12 has a high cooling ability, the biscuit part 28 solidifies quickly and, hence, the die timer can be shortened. Consequently, the overall cycle time can be shortened. A reduction in cycle time is exceedingly preferred from the standpoint of improving production efficiency.

In the test was used a die casting machine having a clamping force of 135 tons. A sufficiently long die timer (in which the biscuit part 28 came into a completely hardened state) was shortened by 1 second at a time, and the die timer was rated as acceptable when the biscuit part 28 had solidified at the time of mold opening and as unacceptable when the biscuit part 28 had not solidified. The shortest acceptable die timer was evaluated.

The shape of the biscuit part 28 had dimensions of 50 mm (diameter) by 40 mm, and the distance in the spool core 12 between the water cooling hole 14 and the surface was 15 mm. The melt was ADC12 having a temperature of 730° C., and the cast product had a weight of 660 g. The spool core 12 was evaluated also as to whether or not considerable wear was observed therein after 10,000 shots of casting. In the case where a spool core has insufficient high-temperature strength, wear due to melt flow is so marked that a sufficient mold life cannot be ensured.

The results of the test are shown in Table 2. It is desirable that the die timer should be 10 [seconds] or less and the wear should be less than 0.2 mm in terms of depth loss after 10,000 shots of casting.

The die timers in Comparative Example 1 to Comparative Example 3 were as long as 12-14 [seconds]. This is because each of the steels has a coefficient of thermal conductivity as low as 23 [W/m/K] or less and heat exchange therein is difficult. These spool cores 12, on the other hand, had no marked wear after 10,000 shots of casting. This is because these steels have sufficient high-temperature strength.

Figure 2:
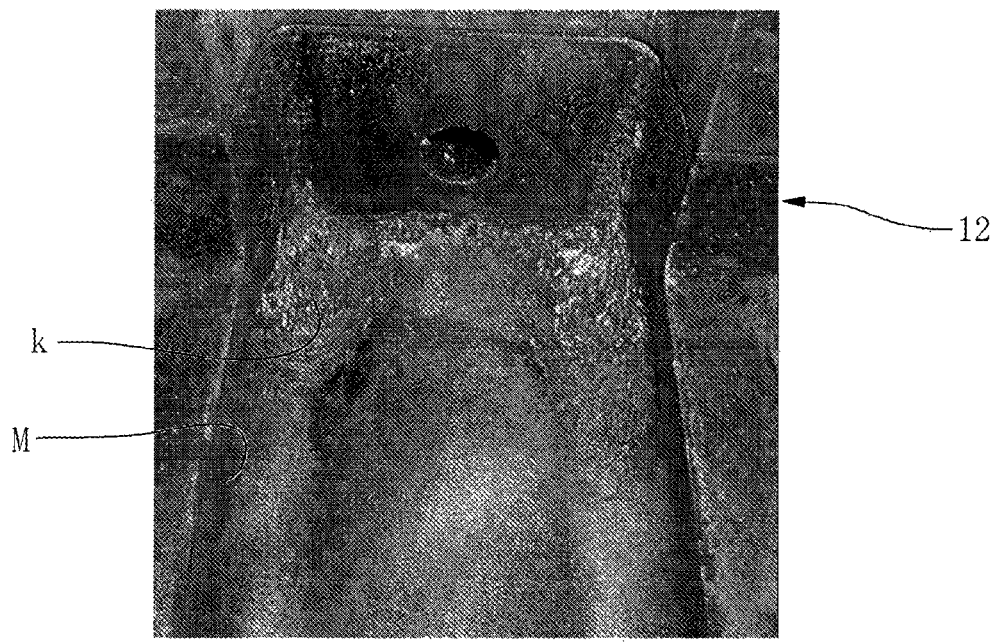
FIG. 2 is a view showing the worn state of a spool core.

In the case of Comparative Example 4, in which the coefficient of thermal conductivity is as high as 38 [W/m/K], the die timer was as short as 8 [seconds], which is a preferred result. However, because of the low high-temperature strength, marked wear was observed after 10,000 shots of casting. It is hence deemed that to ensure a mold life is difficult. The state of this spool core is shown in FIG. 2. In the groove M that constitutes some of the runner 22, a shear droop surface texture due to wear is observed around the corner k where the direction of the flow of the melt changes abruptly.

wear was observed in the spool cores 12 after 10,000 shots of casting. In the Comparative Examples and in the Examples according to the present invention, no crack from the water cooling hole was observed.

Next, with respect to Comparative Example 1 to Comparative Example 3 also, an investigation was made as to whether the die timer was able to be reduced by half. Specifically, spool cores 12 in which the distance between the water cooling hole 14 and the surface had been reduced to 7.5 mm in order to accelerate heat exchange were produced, and a test was conducted under the same conditions as for the test shown in Table 2. The results thereof are shown in Table 3. The die timer was reduced to the same level as that of the Examples according to the present invention shown in Table 2. The mold structure in which the water cooling hole 14 has been disposed nearer to the surface is exceedingly effective in shortening the die timer.

However, a crack from the water cooling hole 14 reached the surface to end the life before completion of the 10,000-shot casting. This is because not only the distance over which the crack pierces the wall has been shortened but also the thermal stress has increased. Although a reduction in die timer is attained, an improvement in the efficiency of die casting production is difficult with such mold structure (since a prolonged period is required for mold replacement). Incidentally, no marked wear was observed in these spool cores as in the test shown in Table 2, although 10,000 shots were not reached.

TABLE 2

|        |             |    | Coefficient of Thermal Conductivity [W/m/K] | Distance between Water Cooling Hole and Surface [mm] | Die Timer [sec] | Wear | Cracking from Water Cooling Hole |
|---|---|---|---|---|---|---|---|
| Test 1 | Examples of the Present Invention | 1 | 36 | 15 | 7 | good | good |
|        |             | 2  | 38 | 15 | 7 | good | good |
|        |             | 3  | 39 | 15 | 6 | good | good |
|        |             | 4  | 35 | 15 | 8 | good | good |
|        |             | 5  | 40 | 15 | 6 | good | good |
|        |             | 6  | 36 | 15 | 7 | good | good |
|        |             | 7  | 37 | 15 | 7 | good | good |
|        |             | 8  | 38 | 15 | 7 | good | good |
|        |             | 9  | 39 | 15 | 6 | good | good |
|        |             | 10 | 40 | 15 | 6 | good | good |
|        |             | 11 | 39 | 15 | 6 | good | good |
|        |             | 12 | 34 | 15 | 8 | good | good |
|        |             | 13 | 31 | 15 | 9 | good | good |
|        | Comparative Examples | 1 | 23 | 15 | 12 | good | good |
|        |             | 2 | 19 | 15 | 14 | good | good |
|        |             | 3 | 19 | 15 | 14 | good | good |
|        |             | 4 | 38 | 15 | 7 | poor | good |

TABLE 3

|        |             |   | Coefficient of Thermal Conductivity [W/m/K] | Distance between Water Cooling Hole and Surface [mm] | Die Timer [sec] | Wear | Cracking from Water Cooling Hole |
|---|---|---|---|---|---|---|---|
| Test 2 | Comparative Examples | 1 | 23 | 7.5 | 6 | good | poor |
|        |             | 2 | 19 | 7.5 | 7 | good | poor |
|        |             | 3 | 19 | 7.5 | 7 | good | poor |

In each of the thirteen Examples according to the present invention, the die timer was as extremely short as 9 [seconds] or less. This is because each of the steels has a coefficient of thermal conductivity as high as 31 [W/m/K] or higher and heat exchange is easy. Furthermore, since these steels had sufficient high-temperature strength, no marked As can be seen from the results given above, the Examples according to the present invention render a reduction in die timer possible while preventing wear and water cooling hole cracking and thereby ensuring a mold life. In the Comparative Examples, to ensure a mold life results in a prolonged die timer, and to shorten the die timer makes it impossible to ensure a mold life. The reason why the Examples according to the present invention can attain both an ensured mold life and a reduction in die timer is that the steels have high high-temperature strength and a high coefficient of thermal conductivity.

Although Examples according to the present invention were described above in detail, these are mere examples.

The steel of the present invention, which combines a high coefficient of thermal conductivity and high high-temperature strength, is suitable also for a mold for injection-molding resins, besides molds for die casting. The steel of the present invention exhibits high performance when used also as, for example, molds for steel-plate hot pressing (also called hot stamping or die quenching). In this case, even when the steel of the present invention is applied to mold production not by additive manufacturing but by ordinary machining and heat treatments, this mold is more effective in ensuring mold life and shortening the cycle time than molds of any conventional steel which have the same shape and have been manufactured by the same method.

It is also effective to combine a mold formed from the steel of the present invention with a surface modification (shot blasting, sand blasting, nitriding, PVD, CVD, plating, etc.).

The steel of the present invention can be used also as a welding material in the form of a rod or wire. Specifically, either a mold produced by additive manufacturing or a mold produced by machining a material obtained by working an ingot can be repaired by welding using a welding material constituted of the steel for a mold according to the present invention. In this case, the chemical components of the mold to be repaired may be different from the ranges for the steel of the present invention or may be within the ranges for the steel of the present invention. In either case, the portion repaired with the welding material constituted of the steel of the present invention has high high-temperature strength and a high coefficient of thermal conductivity which are exhibited due to the components of the steel of the present invention.

Other various modifications can be made in the present invention without departing from the spirit of the invention.

The present application is based on Japanese Patent Application No. 2014-093742 filed on Apr. 30, 2014, and the contents thereof are incorporated herein by reference.

DESCRIPTION OF REFERENCE NUMERALS AND SIGNS

10 Die casting mold
12 Spool core
14 Cooling circuit

What is claimed is:

1. A steel for a mold, having a composition comprising, on a % by mass basis:
   $0.28\% \leq C < 0.38\%$,
   $0.01\% < Si < 0.30\%$,
   $0.92\% < Mn \leq 1.41\%$,
   $0.8\% < Cr \leq 1.91\%$,
   $0.8\% < Mo < 1.4\%$, and
   $0.31\% \leq V < 0.58\%$,
   with the balance being Fe and inevitable impurities,
   having a coefficient of thermal conductivity at 25° C., evaluated by a laser flash method, of 28 W/m/K or higher, and being used as a material for manufacturing a mold by additive manufacturing.

2. The steel for a mold according to claim 1, further comprising, on a % by mass basis:
   $0.1\% < Al < 1.2\%$.

3. The steel for a mold according to claim 1, further comprising, on a % by mass basis, at least either of the following:
   $0.30\% < Ni \leq 3.5\%$, and
   $0.30\% < Cu \leq 1.5\%$.

4. The steel for a mold according to claim 1, further comprising, on a % by mass basis:
   $0.0001\% < B \leq 0.0050\%$.

5. The steel for a mold according to claim 1, further comprising, on a % by mass basis, at least one of the following:
   $0.003\% < S \leq 0.250\%$,
   $0.0005\% < Ca \leq 0.2000\%$,
   $0.03\% < Se \leq 0.50\%$,
   $0.005\% < Te \leq 0.100\%$,
   $0.01\% < Bi \leq 0.50\%$, and
   $0.03\% < Pb \leq 0.50\%$.

6. The steel for a mold according to claim 1, further comprising, on a % by mass basis, at least one of the following:
   $0.004\% < Nb \leq 0.100\%$,
   $0.004\% < Ta \leq 0.100\%$,
   $0.004\% < Ti \leq 0.100\%$, and
   $0.004\% < Zr \leq 0.100\%$.

7. The steel for a mold according to claim 1, further comprising, on a % by mass basis, at least either of the following:
   $0.10\% < W \leq 4.00\%$, and
   $0.10\% < Co \leq 3.00\%$.

8. The steel for a mold according to claim 1, wherein the material is a powder or plates.

9. A mold manufactured by additive manufacturing by using the steel for a mold described in claim 1.

* * * * *